United States Patent
Yoon et al.

(10) Patent No.: US 9,725,876 B2
(45) Date of Patent: Aug. 8, 2017

(54) DREDGED SOIL TRANSPORT SYSTEM AND ITS CONTROL METHOD THEREOF

(71) Applicant: Korea Institute of Ocean Science & Technology, Gyeonggi-do (KR)

(72) Inventors: Gil-Lim Yoon, Gyeonggi-do (KR); YuSeung Kim, Seoul (KR)

(73) Assignee: KOREA INSTITUTE OF OCEAN SCIENCE & TECHNOLOGY, Ansan-si, Gyeonggi-Do (KR)

( * ) Notice: Subject to any disclaimer, the term of this patent is extended or adjusted under 35 U.S.C. 154(b) by 7 days.

(21) Appl. No.: 14/388,811

(22) PCT Filed: Oct. 15, 2013

(86) PCT No.: PCT/KR2013/009192
§ 371 (c)(1),
(2) Date: Sep. 28, 2014

(87) PCT Pub. No.: WO2014/168304
PCT Pub. Date: Oct. 16, 2014

(65) Prior Publication Data
US 2016/0258130 A1    Sep. 8, 2016

(30) Foreign Application Priority Data
Apr. 9, 2013  (KR) .......................... 10-2013-0038544

(51) Int. Cl.
*E02F 3/90*    (2006.01)
*E02F 7/10*    (2006.01)
(Continued)

(52) U.S. Cl.
CPC ................ *E02F 3/907* (2013.01); *E02F 7/10* (2013.01); *F16L 55/00* (2013.01); *G05D 7/0676* (2013.01)

(58) Field of Classification Search
CPC .......... E02F 3/907; E02F 7/10; G05D 7/0676; F16L 55/00
(Continued)

(56) References Cited

U.S. PATENT DOCUMENTS 4,551,041 A * 11/1985 Coon .................... B08B 9/0326
134/1
5,074,998 A * 12/1991 De Baat Doelman .. C02F 1/485
210/222

(Continued)

FOREIGN PATENT DOCUMENTS

JP    2001-049694 A    2/2001
KR    101249911 B1    4/2013

*Primary Examiner* — Jessica Cahill
*Assistant Examiner* — Daphne M Barry
(74) *Attorney, Agent, or Firm* — Revolution IP, PLLC (57) ABSTRACT

The present invention provides a dredged soil transport system including a pipe module wound with a coil applying an electromagnetic field to an internally flowing dredged soil and including a plurality of pipelines, a pump module configured to provide a transport pressure for transport of dredged soil to the pipe module, database stored with flow information on flow velocity and flow form in response to physical properties of liquefied unit, and a control module communicating with the pipe module, the pump module and the database wiredly and wirelessly and applying, to the coil, a current of waveform matching to a flow waveform of the dredged soil transported inside the pipeline, and a control method thereof.

9 Claims, 8 Drawing Sheets (51) Int. Cl.
*F16L 55/00* (2006.01)
*G05D 7/06* (2006.01)

(58) Field of Classification Search
USPC .............. 137/827, 13; 406/50, 85, 192, 198; 198/619; 73/570.5
See application file for complete search history.

(56) References Cited

U.S. PATENT DOCUMENTS

| | | | |
|---|---|---|---|
| 6,679,324 B2 * | 1/2004 | Den Boer | E21B 34/066 137/827 |
| 2009/0095352 A1 * | 4/2009 | Kovalcik | C02F 1/48 137/13 |
| 2016/0325948 A1 * | 11/2016 | Yoon | B65G 53/10 |

* cited by examiner

DREDGED SOIL TRANSPORT SYSTEM AND ITS CONTROL METHOD THEREOF

CROSS REFERENCE TO RELATED APPLICATIONS AND CLAIM OF PRIORITY

This patent application is a National Phase application under 35 U.S.C. §371 of International Application No. PCT/KR2013/009192, filed Oct. 15, 2013, which claims priority to Korean Patent Application No. 10-2013-0038544, filed Apr. 9, 2013, entire contents of which are incorporated herein by reference.

BACKGROUND

Technical Field

The present invention relates to a dredged soil transport system configured to lengthen a dredge soil transport distance using electromagnetic field for reduction of dredged soil transport pressure, and a control method thereof.

Background Invention

Dredged soils are soils deposited on rivers or oceans for obtaining soils and sands necessary for construction sites, and although river dredged soils are of good quality, ocean dredged soils are preferred due to the river dredged soils being limited in quantity and feared to cause river pollution and/or ecocide, and therefore, the ocean dredged soils and techniques of collecting the ocean dredged soils are being focused.

Methods of collecting the ocean dredged soils and transporting to a destination may be largely divided to three types. That is, a transport method using pipelines, a transport method using conveyors and a transport method using dump trucks.

Although the conveyor-using transport method is advantageous in that the conveyor-using transport method is adequate to a long-distance transport of dredged soils, the conveyor-using transport method is disadvantageous in that transport equipment and installation costs are expensive, and repair/maintenances are not easy.

Although the dump truck-using transport method is largely used, the dump truck-using transport method is not economically advantageous due to generation of noise and dusts, when long transport distance is required.

The method of transport the dredged soil using a pipeline may be divided in turn to a transport method using a pump and a method using compressed air.

Although the method using the compressed air is similar to the method using a pump, the method using the compressed air has a higher dredged soil residual rate in transport of the dredged soil over the method using the pump.

Furthermore, the method using the compressed air is disadvantageous in terms of technical solution, because the pipeline is clogged when the dredged soil contains more than 60% of sandy soil, and therefore, water must be poured.

Thus, although it is general that the pipeline-using transport method is currently used, there may be lots of technical problems to be technically solved when dredged soils are transported long distance over 30 km.

Although the long distance transport of dredged soils take consideration of using relay pump methods using a booster line and transport methods using a siphon principle, these methods also entail problems of increasing dredging costs.

To be more specific, many stations are required for transport of dredged soils, that is, many high performance pumps are required at every place where fluids are pressurized and flow velocity is acquired, whereby installation costs of pumps and fuel costs for using the pumps increase geometrically.

Furthermore, material costs and installation costs of pipelines greatly increase because pressure inside the pipelines is high. Currently used pipelines are cast iron pipes which are not efficient for high pressure.

Another disadvantage is that replacement periods are shortened due to damages to mechanical installation equipment including pipes and wear and tear of pipelines that require withstand of high pressure to thereby increase overall costs.

Still further disadvantage is that it is difficult to find a position of a clogged pipeline when a pipeline is clogged by dredged soils during long-distance transport of the dredged soils, and particularly, it is difficult to repair pipelines when the pipelines buried under ground are clogged and/or when the pipelines are holed.

Thus, it is imperative that efficient transport systems for dredged soils be developed on an urgent base.

SUMMARY

The present invention is provided to solve the various aforementioned problems and it is an object of the present invention to provide a dredged soil transport system configured to reduce resistance to fluid flow of dredged soil inside a pipeline and to promote an efficient dredged soil transport by grasping flow situation during transport of dredged soil and by applying an electromagnetic field having a waveform catering to field situation, and a control method thereof.

In one general aspect of the present invention, there is provided a dredged soil transport system, the system including:

a pipe module wound with a coil applying an electromagnetic field to an internally flowing dredged soil and including a plurality of pipelines;

a pump module configured to provide a transport pressure for transport of dredged soil to the pipe module;

database stored with flow information on flow velocity and flow form in response to physical properties of liquefied unit; and a control module communicating with the pipe module, the pump module and the database wiredly and wirelessly and applying, to the coil, a current of waveform matching to a flow waveform of the dredged soil transported inside the pipeline.

Preferably, but not necessarily, the pump module may include a pump pressure sensor unit configured to grasp a stroke period of the pump and to convert the grasped stroke period of the pump to a voltage signal, and the pipe module includes a pipe pressure sensor unit configured to grasp flow velocity and waveform of the dredged soil transported into the pipeline and to convert the grasped flow velocity and waveform of the dredged soil to a pressure signal.

Preferably, but not necessarily, the pipe pressure sensor unit may include a first pressure sensor and a second pressure sensor each installed by being spaced apart at a predetermined distance.

Preferably, but not necessarily, the control module may include a central computation unit configured to generate a flow signal for controlling transport of the dredged soil by comparing the flow velocity and waveform in response to the physical properties of the dredged soil received from the database with an actual flow velocity and waveform of the dredged soil transported into the pipeline, a function generation unit configured to convert the flow signal using a function by receiving the flow signal from the central computation unit, a pulse generation unit configured to convert the voltage signal received from the pipe pressure sensor unit to a pulse signal using the function by receiving the voltage signal received from the pipe pressure sensor unit and by receiving a function from the function generation unit, and a bridge circuit unit configured to receive the pulse signal from the pulse generation unit and to convert a current received from outside to a current having the pulse signal and to apply the converted current to the coil.

Preferably, but not necessarily, the pulse generation unit may include a pulse detection unit configured to detect an amplitude and a period of a pulse of the voltage signal by receiving the voltage signal from the pipe pressure sensor unit, an integral circuit unit configured to convert a pressure waveform energy proportional to a pulse waveform period to a voltage signal by receiving the amplitude and size detected by the pulse detection unit, a PWM (Pulse Width Modulation) generation unit configured to generate a PWM period pulse in response to a pulse waveform period by receiving a voltage signal from the integral circuit unit, and a pulse generation unit configured to convert the PWM period pulse received from the PWM generation unit using the function received from the function generation unit, and to convert the converted PWM period pulse to a gate voltage of the bridge circuit unit.

Preferably, but not necessarily, the system may further include a state measurement unit configured to monitor flow velocity and pressure change of the dredged soil inside the pipeline.

Preferably, but not necessarily, the state measurement unit may monitor the flow velocity and pressure change of flow inside the dredged soil using the following equation:

$$\nabla p = f * \frac{L}{D} * \frac{\rho}{2} * v^2 \qquad \langle\text{Equation}\rangle$$

where, f is a friction factor, L is a distance between first pressure sensor and second pressure sensor, D is a diameter of pipeline, ρ is a density of dredged soil, and v is a flow velocity obtained through pump pressure sensor.

Preferably, but not necessarily, the flow information of the dredged soil stored in the database may be updatable, additionable, changeable and deletable.

In another general aspect of the present invention, there is provided a control method of dredged soil transport system including a pipe module configured to transport dredged soils, a pump module, database and a control module, the method including:

a first step of detecting flow velocity and waveform of dredged soil transported from a pressure sensor formed at the pipe module and the pump module;

subsequently, a second step of receiving, by the control module, the waveform and the database of the dredged soil detected from the first step and the flow velocity and waveform in response to physical properties from the database;

subsequently, a third step of generating a current of waveform matching to flow waveform of the dredged soil transported inside the pipeline by comparing the flow velocity and waveform in response to the physical properties of dredged soil received from the database with the flow velocity and waveform of the dredged soil detected from the first step; and subsequently, a fourth step of applying the generated current to a coil wound on the pipeline of the pipe module.

Preferably, but not necessarily, the third step may include a 3-1 step of generating a flow signal for controlling transport of the dredged soil based on an actual flow velocity and waveform of the dredged soil detected from the first step, subsequently, a 3-2 step of generating a function based on the flow velocity and waveform in response to the physical properties of the dredged soil received from the database, subsequently, a 3-3 step of converting the flow signal to a pulse signal using the function; and subsequently, a 3-4 step of converting a current received from outside to a current having the pulse signal.

The present invention can advantageously reduce transport costs by transporting dredged soil using a relatively small size of pump capacity when the dredged soil is transported to a long distance area.

Furthermore, the present invention can advantageously reduce damages of various transport equipment caused by long pipeline replacement period and pressure drop because the dredged soil can be transported under an environment where a transport pressure inside a pipeline is relatively low.

Still furthermore, the present invention can advantageously reduce an overall cost of a dredged soil transport system.

DETAILED DESCRIPTION

Hereinafter, exemplary embodiments of the present disclosure will be described in detail with reference to the accompanying drawings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Like reference numerals designate like elements throughout the specification.

Figure 1:
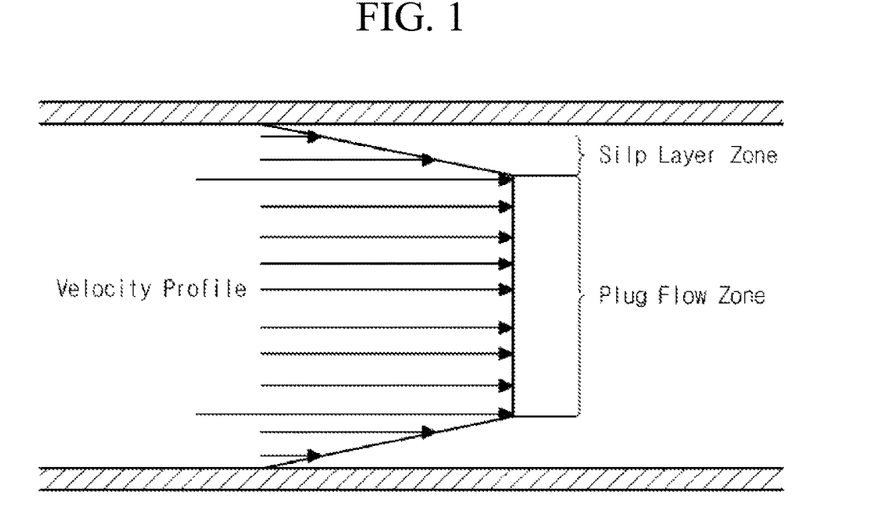
FIG. 1 is a schematic view illustrating flow of dredged soil inside a pipeline.
Figure 2:
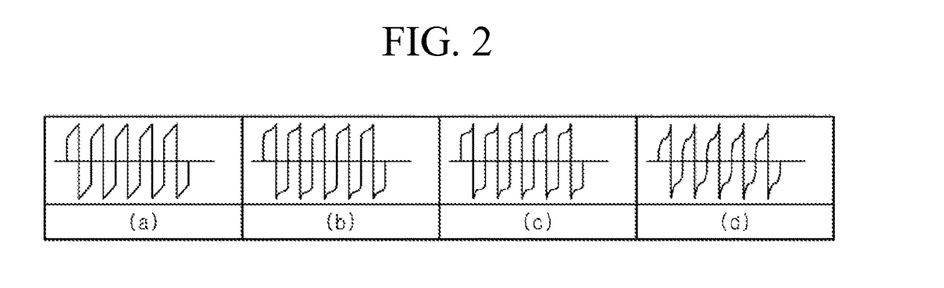
FIG. 2 is a schematic view illustrating a waveform in response to physical properties of fluid mixture.
Figure 3:
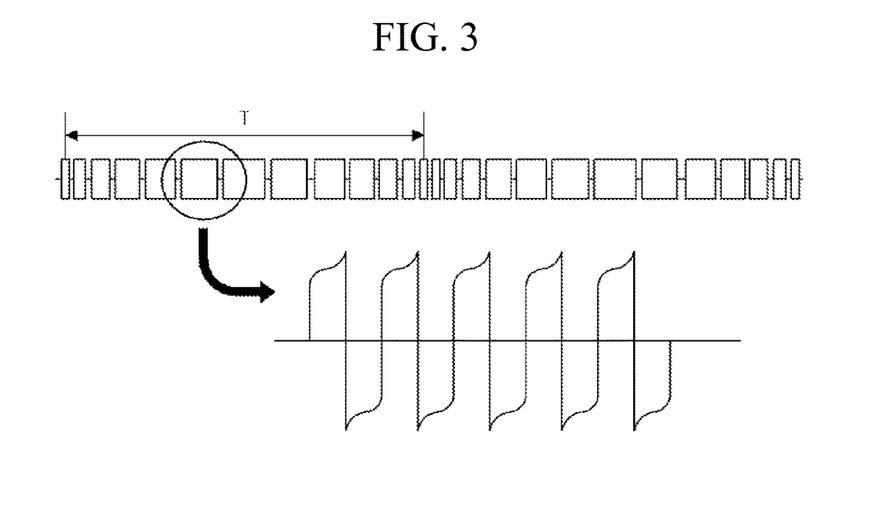
FIG. 3 is a schematic view illustrating a waveform change relative to flow velocity of dredged soil.

FIG. 1 is a schematic view illustrating flow of dredged soil inside a pipeline, FIG. 2 is a schematic view illustrating a waveform in response to physical properties of fluid mixture, and FIG. 3 is a schematic view illustrating a waveform change relative to flow velocity of dredged soil.

A Newtonian fluid dominated by viscosity in flow inside a pipeline becomes dominant force on a wall surface of the pipeline, and an inertial force in turn becomes a dominant force toward a center of the pipeline. At this time, flow velocity develops as a function in response to a radius of the pipeline.

However, the dredged soil shows not a Newtonian fluid behavior, but a non-Newtonian fluid behavior, where yield stress for forming flow becomes an important element along with the viscosity of fluid.

FIG. 2 is a schematic view illustrating change in waveform of non-Newtonian fluid in the Newtonian fluid, where (a) shows a waveform of pure water having a low viscosity, (c) shows a waveform of dredged soil or mortar, (b) shows a waveform of fluid having a viscosity between (a) and (c), and (d) shows a waveform of high viscosity fluid such as concrete.

The flow velocity in the flow takes a different shape from that of a Newtonian fluid due to action between the yield stress and viscosity, and particularly, characteristic of flow velocity in the mixture such as dredged soil takes the shape as illustrated in FIG. 1.

An inner surface of the pipeline is formed with a flow-generating slip layer or slip layer zone due to influence of viscosity, and the inner surface shows a plug flow zone similar to rigid body motion toward a central layer of the pipeline.

When the mixture such as the dredged soil is moved by growing pressure due to inertia and viscosity, components having a greater mass moves to a center of pipeline, and the slip layer at the surface of the pipeline is flowed with particles such as water and mud having relatively smaller mass.

Thus, friction at the pipeline may largely act in three ways due to flow characteristics. That is, friction between the pipeline and fluid, friction factor and friction between the slip layer and central layer, and control of these frictions may reduce the friction with the pipeline across the board.

The decrease in friction with the pipeline will eventually reduce the pressure fall amount of fluid inside the pipeline to thereby increase the flow velocity, whereby consumption of power generating the pressure for transfer can be reduced.

The present invention is to control flow by applying an electromagnetic field to the pipeline, and the most essential core technology of the present invention is a control technology that does not simply apply an electromagnetic field, but applies an appropriate electromagnetic pulse by being converged with information such as elements of transported flow and flow parameters (flow amount/flow velocity/flow pressure).

Thus, as illustrated in FIG. 3, the present invention generates an electric pulse using a period (T) corresponding to an actual flow by adjusting the period (T) that generates a waveform of dredged soil as shown in (c) of FIG. 2.

Figure 4:
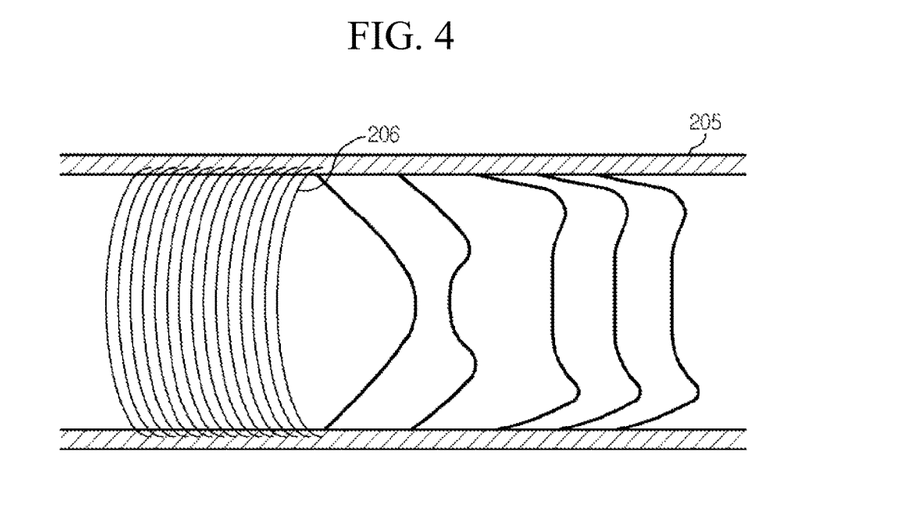
FIG. 4 is a schematic view illustrating a dredged soil flow when an electromagnetic field is applied due to the dredged soil transport system according to an exemplary embodiment of the present invention.

FIG. 4 is a schematic view illustrating a dredged soil flow when an electromagnetic field is applied due to the dredged soil transport system according to an exemplary embodiment of the present invention, where a dredged soil flow according to the dredged soil transport system is to apply an appropriate electromagnetic field in response to actual circumstance of dredged soil flow, whereby a magnetic flow as a waveform at the right side of the FIG. 4.

Now, the dredged soil transport system thus described to realize the technical idea of the present invention will be explained in the following manner.

Figure 5:
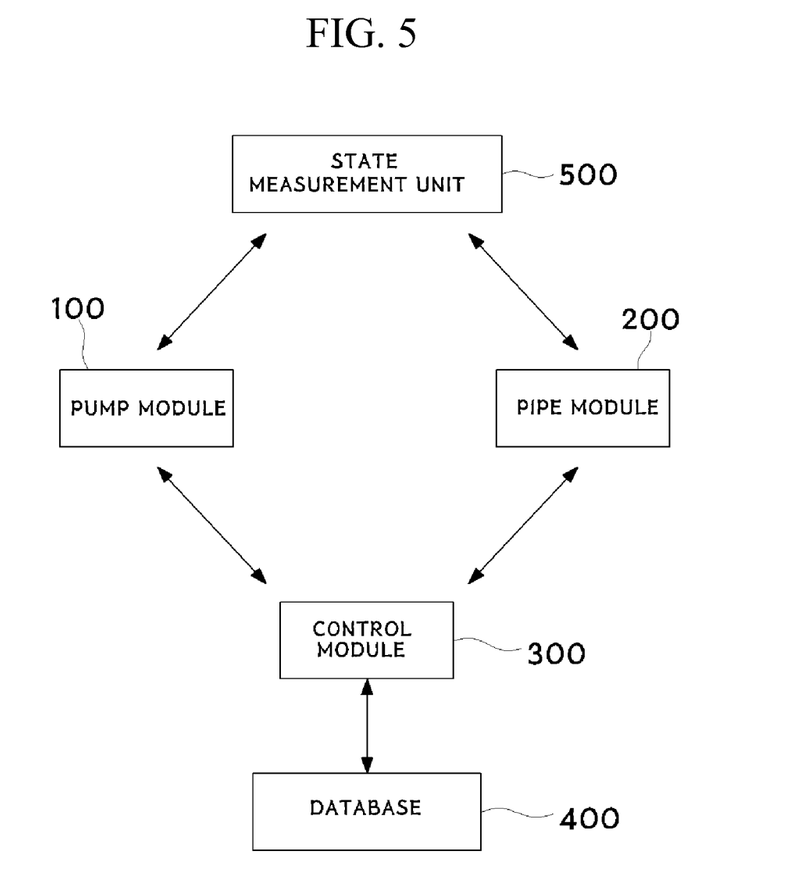
FIG. 5 is a schematic view illustrating a dredged soil transport system according to an exemplary embodiment of the present invention.
Figure 6:
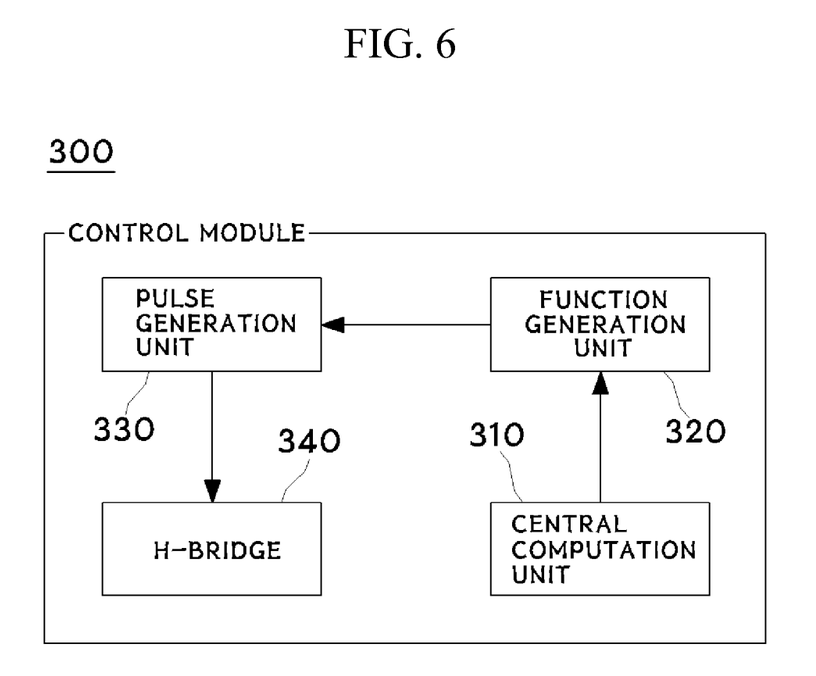
FIG. 6 is a schematic view illustrating a control module of a dredged soil transport system according to an exemplary embodiment of the present invention.
Figure 7:
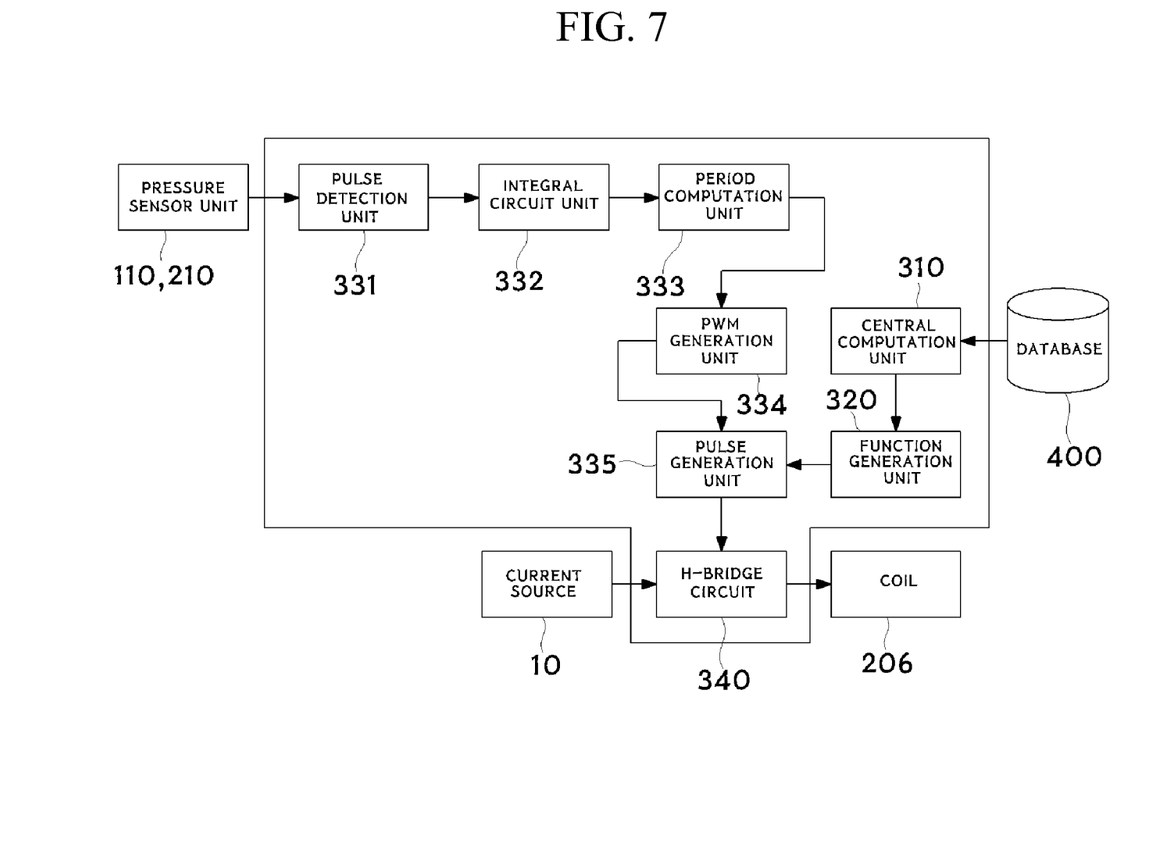
FIG. 7 is a schematic view illustrating an overall operation flow for applying an electromagnetic field of the dredged soil transport system according to an exemplary embodiment of the present invention.

FIG. 5 is a schematic view illustrating a dredged soil transport system according to an exemplary embodiment of the present invention, FIG. 6 is a schematic view illustrating a control module of a dredged soil transport system according to an exemplary embodiment of the present invention, and FIG. 7 is a schematic view illustrating an overall operation flow for applying an electromagnetic field of the dredged soil transport system according to an exemplary embodiment of the present invention.

Referring to FIG. 5, the dredged soil transport system according to an exemplary embodiment of the present invention may largely include a pump module (100), a pipe module (200), a control module (300), database (400) and a state measurement unit (500).

The pipe module (200) may include a plurality of pipelines (205) on which a coil (206, see FIG. 4) is wound to apply an electromagnetic wave to the dredged soil.

To be more specific, the coil (206) is formed with a conductive material such as a copper, and is wound on the pipeline (205) to a flow direction of the dredged soil in consideration of Faraday's right hand rule.

The pipeline (205) is formed by being connected with a plurality of pipelines (205) in consideration of long distance transport of dredged soil, and a diameter of the pipeline (205) is preferably 0.5 m for efficient transport of dredged soil, but it should be apparent that the diameter of the pipeline may be changed in consideration of dredged soil and construction period.

Furthermore, the pipe module (200) may include a pipe pressure sensor unit (210) configured to grasp flow velocity and waveform of the dredged soil transported into the pipeline (205) and to convert the grasped flow velocity and waveform of the dredged soil to a voltage signal. The pipe pressure sensor unit (210) may be a first pressure sensor (210a) and a second pressure sensor (210b) each installed by being spaced apart at a predetermined distance.

The pump module (100) provides a transport pressure to the pipe module (200) for transport of dredged soil. Each of the pump modules (100) is preferably arranged at a predetermined distance to provide a fluid to each section whereby flow velocity can be obtained.

Furthermore, the pump module (100) may include a pump pressure sensor unit (110) converting a grasped stroke period of pump to a voltage signal by grasping the stroke period of the pump.

The database (400) is stored with flow information on flow velocity and waveform according to physical properties of the dredged soil. The flow information of dredged soil stored in the database (400) is preferably updated, added, changed or deleted by being connected wiredly or wirelessly by a user.

The control module (300) may wiredly or wirelessly communicate with the pipe module (200), the pump module (100) and the database (400), and apply, to the coil (206, see FIG. 4) a current of waveform matching to the flow waveform of the dredged soil transported into the pipeline (205).

To be more specific, referring to FIG. 6, the control module (300) according to an exemplary embodiment of the present invention may include a central computation unit (310), a function generation unit (320), a pulse generation unit (330) and a bridge circuit unit (340).

The central computation unit (310) generates a flow signal for controlling the transport of dredged soil by comparing the flow velocity and waveform in response to the physical properties of the dredged soil received from the database (400) with an actual flow velocity and waveform of the dredged soil transported into the pipeline (205).

The function generation unit (320) receives a flow signal from the central computation unit (310) and converts the flow signal to a function.

The pulse generation unit (330) receives a voltage signal from the pipe pressure sensor unit (210), and receives the function from the function generation unit (320), and converts the voltage signal received from the pipe pressure sensor unit (210) to a pulse signal using the function.

To be more specific, referring to FIG. 7, the pulse generation unit (330) may include a pulse detection unit (331) configured to detect an amplitude and period of the pulse of the voltage signal by receiving the voltage signal from the pipe pressure sensor unit (210), an integral circuit unit (332) configured to convert a pressure waveform energy proportional to the pulse waveform period to a voltage signal by receiving an amplitude and size of the pulse detected by the pulse detection unit (331), a PWM generation unit (334) configured to generate a PWM period pulse in response to the pulse waveform period by receiving the voltage signal from the integral circuit unit (332), a pulse generation unit (335) configured to convert the PWM period pulse received from the PWM period generation unit (334) using the function received from the function generation unit (320), and to convert the converted PWM period pulse to a gate voltage of the bridge circuit unit (340).

The bridge circuit unit (340) converts the current received from outside to a current having the pulse signal by receiving the pulse signal from the pulse generation unit (330), and applies the current to the coil (206, see FIG. 4).

Now, operation of the dredged soil transport system according to an exemplary embodiment of the present invention will be described in detail with reference to FIG. 7.

The dredged soil transport system according to an exemplary embodiment of the present invention is such that flow velocity of the dredged soil is grasped from the stroke period detected by the pump pressure sensor unit (110) formed on the pump module (100), and converts to a voltage signal by detecting waveform and period of the actually flowing dredged soil from the pipe pressure sensor unit (210) formed at the pipe module (200).

The control module (300) generates an optimal electromagnetic field for effective flow using actual flow information of the dredged soil and information on the physical properties of the dredged soil received from the database and applies, to the coil (206, see FIG. 4), a waveform of special type that changes according to circumstances.

Meantime, the dredged soil transport system according to an exemplary embodiment of the present invention may further include a state measurement unit (500) configured to monitor flow velocity and pressure change of dredged soil flow inside the pipeline (205) by controlling the control module (300) and the pump module.

Figure 8:
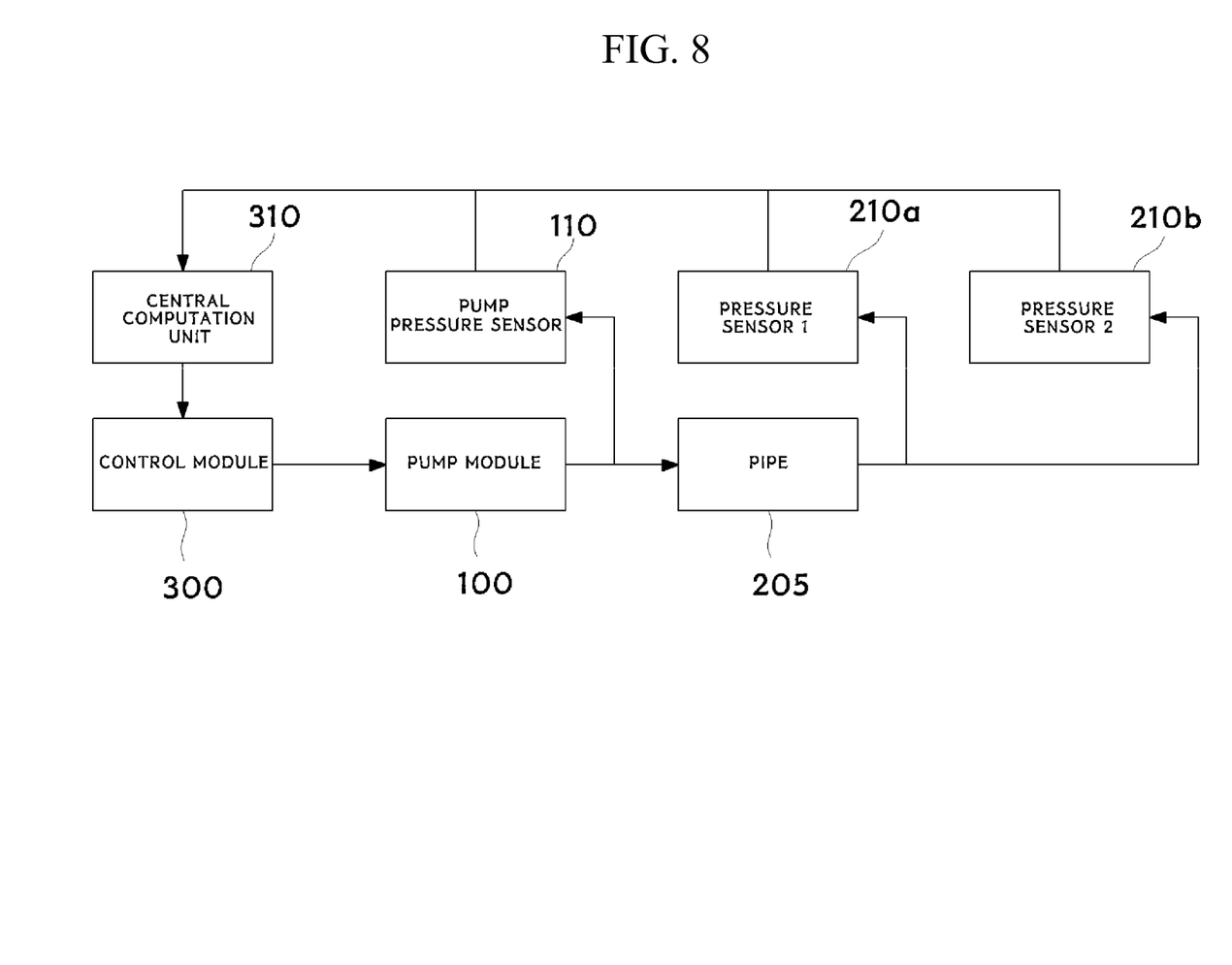
FIG. 8 is a schematic block diagram illustrating an entire operation flow for state measurement of a dredged soil transport system according to an exemplary embodiment of the present invention.

FIG. 8 is a schematic block diagram illustrating an entire operation flow for state measurement of a dredged soil transport system according to an exemplary embodiment of the present invention.

Referring to FIG. 8, the state measurement unit (500) according to an exemplary embodiment of the present invention may be included in the central computation unit (310) of the control module (300).

The state measurement unit (500) can monitor the flow velocity and pressure change of flow in the dredged soil using the following equation.

$$\nabla p = f * \frac{L}{D} * \frac{\rho}{2} * v^2 \qquad \langle \text{Equation}\rangle$$

where, f is a friction factor, L is a distance between first pressure sensor (210*a*) and second pressure sensor (210*b*), D is a diameter of pipeline (205), ρ is a density of dredged soil, and v is a flow velocity obtained through pump pressure sensor.

The state measurement unit (500) can measure the pressure change using the abovementioned equation, and the central computation unit (310) can control the pump module (100) and the pipe module (200) in consideration of the measured state. That is, the central computation unit (310) can control the stroke of the pump and can control the electromagnetic field of the coil (206, see FIG. 4) wound on the pipeline (205).

Now, a control method of a long distance dredged soil transport system using magnetic field and tornado eddy current technique will be described in the following manner.

Figure 9:
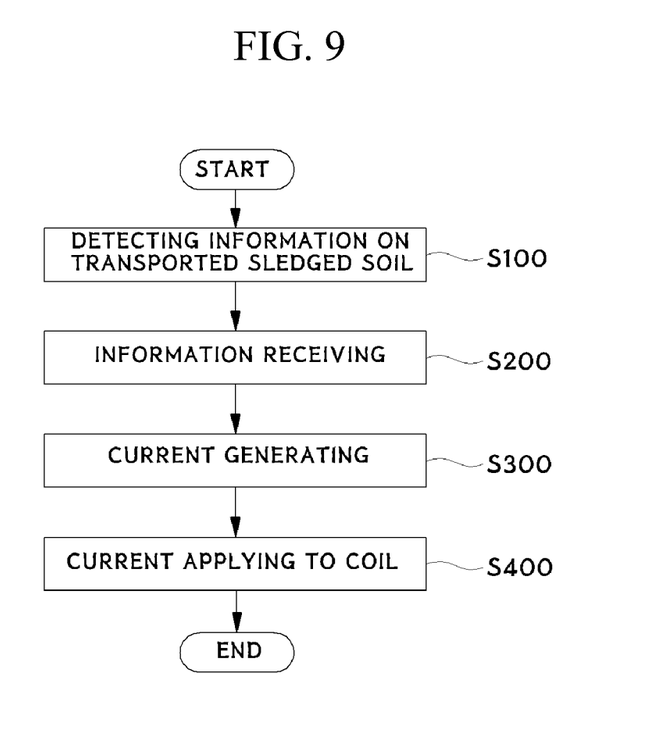
FIG. 9 is a schematic flowchart illustrating a control method of a dredged soil transport system according to an exemplary embodiment of the present invention.
Figure 10:
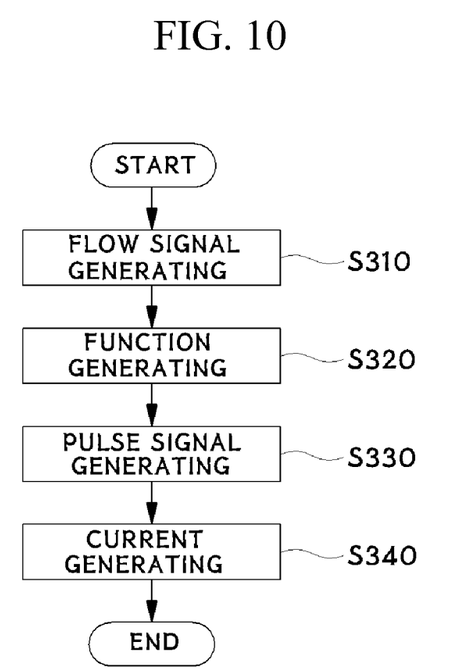
FIG. 10 is a detailed flowchart of S300 in FIG. 9.

FIG. 9 is a schematic flowchart illustrating a control method of a dredged soil transport system according to an exemplary embodiment of the present invention, and FIG. 10 is a detailed flowchart of S300 in FIG. 9.

Referring to FIG. 9, flow velocity and waveform of the dredged soil are first detected that are transported from a pressure sensor formed at the pipe module (200) and pump module (100) (S100).

Subsequently, flow velocity and waveform of the dredged soil detected by the above first step (S100) and the flow velocity and waveform in response to the physical properties of the dredged soil from the database (400) are received by the control module (300) (S200).

Then, comparison is made between the flow velocity and waveform in response to the physical properties of the dredged soil received from the database (400) and the flow velocity and waveform of the dredged soil detected by the above first step (S100) to generate a current (S300) of waveform corresponding to that of flow in the dredged soil transported into the pipeline (205).

Thereafter, the current thus generated is applied to the coil (206, see FIG. 4) wound on the pipeline (205) of the pipe module (200) (S400).

To be more specific, the S300 is controlled by the following flow.

A flow signal is generated for controlling transport of liquefied unit (10) based on actual flow velocity and waveform of the liquefied unit (10) (S310).

Then, a function is generated based on the flow velocity and waveform in response to the physical properties of the liquefied unit (10) received from the database (400) (S320).

Subsequently, the flow signal is converted to a pulse signal using the function (S330).

Then, a current supplied from outside is converted to a current having the pulse signal (S340).

In short, the present invention has an industrial applicability in that actual flow velocity and waveform of dredged soil flowing from the pipeline (205) is detected in real time, the dredged soil is controlled by comparing the information according to the physical properties stored in the database (400) with the actual flow velocity and waveform of dredged soil flowing from the pipeline (205), whereby dredged soil having a small energy can be efficiently transported and to enhance the durability of subsidiary facilities according to the efficient transportation of the dredged soil.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The invention claimed is:

1. A dredged soil transport system, the system comprising:
a pipe module wound with a coil applying an electromagnetic field to an internally flowing dredged soil and including a plurality of pipelines;
a pump module configured to provide a transport pressure for transport of the dredged soil to the pipe module;
database stored with flow information on flow velocity and flow form in response to physical properties of the dredged soil; and
a control module communicating with the pipe module, the pump module and the database wiredly and wirelessly and applying, to the coil, a current of waveform matching to a flow waveform of the dredged soil transported inside the pipeline,
wherein the pump module includes a pump pressure sensor unit configured to grasp a stroke period of the pump and to convert the grasped stroke period of the pump to a voltage signal,
wherein the pipe module includes a pipe pressure sensor unit configured to grasp flow velocity and waveform of the dredged soil transported into the pipeline and to convert the grasped flow velocity and waveform of the dredged soil to a pressure signal.

2. The system of claim 1, wherein the pipe pressure sensor unit includes a first pressure sensor and a second pressure sensor each installed by being spaced apart at a predetermined distance.

3. The system of claim 2, further comprising a state measurement unit configured to monitor flow velocity and pressure change of the dredged soil inside the pipeline.

4. The system of claim 3, wherein the state measurement unit monitors the flow velocity and pressure change of flow inside the dredged soil using the following equation:

$$\nabla p = f * \frac{L}{D} * \frac{\rho}{2} * v^2 \quad \langle\text{Equation}\rangle$$

where, f is a friction factor, L is a distance between first pressure sensor and second pressure sensor, D is a diameter of pipeline, ρ is a density of dredged soil, and v is a flow velocity obtained through pump pressure sensor.

5. The system of claim 1, wherein the control module includes a central computation unit configured to generate a flow signal for controlling transport of the dredged soil by comparing the flow velocity and waveform in response to the physical properties of the dredged soil received from the database with an actual flow velocity and waveform of the dredged soil transported into the pipeline, a function generation unit configured to convert the flow signal using a function by receiving the flow signal from the central computation unit, a pulse generation unit configured to convert the voltage signal received from the pipe pressure sensor unit to a pulse signal using the function by receiving the voltage signal received from the pipe pressure sensor unit and by receiving a function from the function generation unit, and a bridge circuit unit configured to receive the pulse signal from the pulse generation unit and to convert a current received from outside to a current having the pulse signal and to apply the converted current to the coil.

6. The system of claim 5, wherein the pulse generation unit includes a pulse detection unit configured to detect an amplitude and a period of a pulse of the voltage signal by receiving the voltage signal from the pipe pressure sensor unit, an integral circuit unit configure to convert a pressure waveform energy proportional to a pulse waveform period to a voltage signal by receiving the amplitude and size detected by the pulse detection unit, a PWM (Pulse Width Modulation) generation unit configured to generate a PWM period pulse in response to a pulse waveform period by receiving a voltage signal from the integral circuit unit, and a pulse generation unit configured to convert the PWM period pulse received from the PWM generation unit using the function received from the function generation unit, and to convert the converted PWM period pulse to a gate voltage of the bridge circuit unit.

7. The system of claim 1, wherein the flow information of the dredged soil stored in the database is updatable, additionable, changeable and deletable.

8. A control method of dredged soil transport system including a pipe module configured to transport dredged soils, a pump module, database and a control module, the method comprising:
a first step of detecting flow velocity and waveform of dredged soil transported from a pressure sensor formed at the pipe module and the pump module;
subsequently, a second step of receiving, by the control module, the waveform and the database of the dredged soil detected from the first step and the flow velocity and waveform in response to physical properties from the database;
subsequently, a third step of generating a current of waveform matching to flow waveform of the dredged soil transported inside the pipeline by comparing the flow velocity and waveform in response to the physical properties of dredged soil received from the database with the flow velocity and waveform of the dredged soil detected from the first step; and subsequently, a fourth step of applying the generated current to a coil wound on the pipeline of the pipe module.

9. The control method of claim 8,
wherein the third step includes a 3-1 step of generating a flow signal for controlling transport of the dredged soil based on an actual flow velocity and waveform of the dredged soil detected from the first step;

subsequently, a 3-2 step of generating a function based on the flow velocity and waveform in response to the physical properties of the dredged soil received from the database;

subsequently, a 3-3 step of converting the flow signal to a pulse signal using the function; and subsequently, a 3-4 step of converting a current received from outside to a current having the pulse signal.

\* \* \* \* \*